US006538706B2

(12) United States Patent
Sun

(10) Patent No.: US 6,538,706 B2
(45) Date of Patent: Mar. 25, 2003

(54) FLAT PANEL DISPLAY WITH A BUILT-IN TOUCH PANEL AND METHOD FOR MANUFACTURING THE SAME

(75) Inventor: Ming-shen Sun, HsinChu (TW)

(73) Assignee: UNIPAC Optoelectronics Corporation, Hsin-Chu (TW)

(*) Notice: Subject to any disclaimer, the term of this patent is extended or adjusted under 35 U.S.C. 154(b) by 0 days.

(21) Appl. No.: 09/950,676

(22) Filed: Sep. 13, 2001

(65) Prior Publication Data

US 2002/0033920 A1 Mar. 21, 2002

(30) Foreign Application Priority Data

Sep. 19, 2000 (TW) .......................... 89119279 A

(51) Int. Cl.⁷ .................... G02F 1/1343; G02F 1/1339
(52) U.S. Cl. .................. 349/12; 349/155; 349/143
(58) Field of Search .......................... 349/12, 74, 143, 349/141, 148, 155, 187, 96

(56) References Cited

U.S. PATENT DOCUMENTS

| 5,677,744 A | * 10/1997 | Yoneda et al. |
| 5,852,487 A | * 12/1998 | Fujimori et al. |
| 6,069,675 A | * 5/2000 | Mizobata et al. |

* cited by examiner

*Primary Examiner*—William L. Sikes
*Assistant Examiner*—P. R. Akkapeddi
(74) *Attorney, Agent, or Firm*—Bacon & Thomas

(57) ABSTRACT

A liquid crystal display panel having a built-in touch panel is disclosed. The liquid crystal display panel disclosed here includes a display comprising one first substrate, one second substrate, a bottom polarizer and a liquid crystal layer; a top polarizer, a plurality of parallel stripes of first electrodes, a plurality of spacers, said spacers locating between said top polarizer; wherein the projection of said first electrodes on said first substrate intersects the projection of said second electrodes on said first electrodes. Furthermore, a method for manufacturing the liquid crystal display panel illustrated above is also disclosed.

12 Claims, 3 Drawing Sheets

FLAT PANEL DISPLAY WITH A BUILT-IN TOUCH PANEL AND METHOD FOR MANUFACTURING THE SAME

BACKGROUND OF THE INVENTION

1. Field of the Invention

The present invention relates to flat panel display and, more particularly, to liquid crystal display panels having touch panel function and a process for making themselves.

2. Description of Related Art

Currently, various transparent touch panels such as resistance type touch panels, static-electricity-capacity type touch panels and pressure-sensor type touch panels are widely applied in different fields. Recently, liquid crystal display panels combined with touch panels become popular in business and entertainment. Generally, the liquid crystal display panel having touch panel function is achieved by stacking a touch panel on a liquid crystal display panel. Through this way, the light emitting from the light source, i.e. the backlight unit, goes through the liquid crystal display panel and the stacked transparent touch panel to display images. At the same time, the touch panel mounted on the liquid crystal display panel acts as an interface or a medium for inputting foreign signals.

However, this combined device of stacked touch panel and liquid crystal display panel is heavy since the whole set of touch panel device is required to mounted on the liquid crystal touch panel. In addition, for reducing the quivering between the whole set of stacked touch panel and liquid crystal display panel, a protection film (or a rubber cushion layer) is usually placed between the stacked touch panel and the liquid crystal display panel. Therefore, the thickness of the combined panel device increases. Furthermore, most touch panels mounted on the liquid crystal display panels use PET (polyethylene terephthalate) film for supporting the conducting electrodes for sensing the location of pressure on the screen, the brightness of the combined panel device decreases because the reflection and the absorption of the light caused by the PET films increases very much. An improvement for the combination of the stacked liquid crystal display panel and touch panel is necessary now.

Therefore, it is desirable to provide an improved liquid crystal display panel with a built-in touch panel to mitigate the aforementioned problems.

SUMMARY OF THE INVENTION

The object of the present invention is to provide a flat panel display with small thickness, light-weight and a built-in touch panel.

Another object of the present invention is to provide a flat panel display which can reduce the loss of the intensity of the light penetrating through the panels.

Another object of the present invention is to provide a method for manufacturing a flat panel display 1 with small thickness, light weight and built-in touch panel function.

To achieve the object, the liquid crystal display panel of the present invention includes a display comprising one first substrate, one second substrate, a bottom polarizer and a liquid crystal layer; wherein said liquid crystal layer locates between said first substrate and said second substrate, said bottom polarizer locates on the surface of said second substrate; a top polarizer, said top polarizer locating above said first substrate; a plurality of parallel stripes of first electrodes, said first electrodes locating between said top polarizer and on the surface of said first substrate; a plurality of parallel stripes of second electrodes, said second electrodes locating between said top polarizer and said first substrate and between said top polarizer and said first electrodes, wherein said second electrodes are in parallel stripes; and a plurality of spacers, said spacers locating between said top polarizer and said first substrate or between said top polarizer and said first electrodes; wherein the projection of said first electrodes on said first substrate intersects the projection of said second electrodes on said first electrodes.

The method for manufacturing a liquid crystal display panel, comprising following steps: providing a display comprising a first substrate, a second substrate, a bottom polarizer and a liquid crystal layer; wherein said liquid crystal layer locates between said first substrate and said second substrate, said bottom polarizer locates on the surface of said second substrate; forming a plurality of first electrodes in parallel stripes on said first substrate; spraying spacers on the surface of said first substrate to form a layer of spacers; forming a plurality of second electrodes in parallel stripes on a top polarizer or on a top PET (polyterephthalate) film; and placing said top polarizer or said top PET (polyterephthalate) film on said first substrate and said layer of spacers; wherein the projection of said second electrodes on said first substrate intersect the projection of said first electrodes on said first substrate.

Other objects, advantages, and novel features of the invention will become more apparent from the following detailed description when taken in conjunction with the accompanying drawings.

DETAILED DESCRIPTION OF THE PREFERRED EMBODIMENT

The flat panel display used in the present invention can be any conventional flat panel display. Preferably, the flat panel display of the present invention is liquid crystal display panel. The materials of the first electrodes and the second electrodes of the present invention can be any conventional electricity conducting materials. Preferably, the first electrodes or the second electrodes of the present invention are ITOs (intium tin oxide). The flat panel display of the present invention can selectively further comprises a PET (polyethylene terephthalate) film. Preferably, said PET (polyethylene terephthalate) film locates between the top polarizer and the first electrodes, and the second electrodes locating on the surface of the PET (polyethylene terephthalate) film. The second electrodes can locate on either the surface of the top polarizer or the surface of the PET film which is attached on the top polarizer. Preferably, the second electrodes are deposited on the surface of said top polarizer. The first projection of electrodes on first substrate and the projection of the second electrodes on the first substrate intersects each other in many ways. Preferably, the projection of first electrodes on said first substrate intersects with said projection of second electrodes on said first substrate perpendicularly. The panels of the present invention can further comprise auxiliary components. Preferably, the display panels of the present invention further comprise a backlight unit module for providing light for said display unit.

Figure 1:
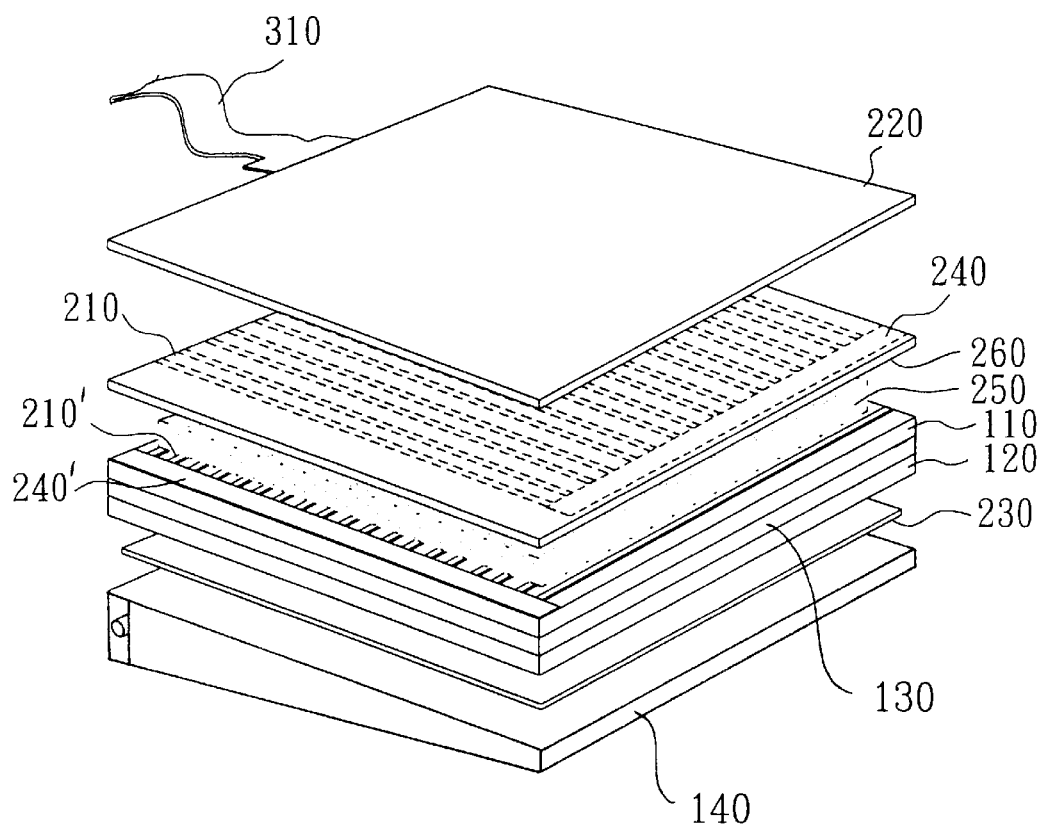
FIG. 1 is a perspective view of one of the embodiment of the liquid crystal display panel of the present invention.

With reference to FIG. 1, there is shown an embodiment of the liquid crystal display panel of the present invention. The TFT LCD (thin film transistor liquid crystal display) basically comprises a top substrate 110, a bottom substrate 120 and a layer of liquid crystal sealed between said top substrate 110 and said bottom substrate 120 (as shown in FIG. 1). For providing colors of the liquid crystal display panel, a layer of color filter is selectively attached to the inner surface of the top substrate 110. Outside the liquid crystal layer, a bottom polarizer 230 is attached to the bottom surface of the bottom substrate 120.

In addition, a plurality of parallel ITO (indium tin oxide) stripes 210 are deposited on the top surface of the top substrate 110. The ITO (indium tin oxide) stripes 210 on the top surface of the top substrate 110 act as bottom electrodes of a built-in touch-panel on the surface of the liquid crystal panel. On the top substrate 110 and the parallel ITO stripes 210, lots of dot spacers are sprayed to form a layer of spacers 250 to maintain homogeneous thickness of the built-in touch panel on the top substrate 110. At one end of the each parallel stripe of the ITO electrodes 210, a silver bar 240 is deposited. The silver bar 240 are placed in a position close to one end of each ITO electrodes 210 on the first substrate 110 and is arranged to crossover each multiple parallel stripe of ITO electrode 210 perpendicularly. The silver bar 240 on the substrate functions as a resistance pressure-sensing mechanism for sensing the resistance of the position of pressure on the built-in touch panel.

On the other hand, a top polarizer 220 which is combined with a PET (polyethylene terephtthalate) film 260 is laid on the top substrate 110 and the layer of the spacers 250. The PET film 260 which is attached to the top polarizer 220 is deposited by multiple parallel stripes of ITO (indium tin oxide) electrodes 210. The parallel ITO stripes 210 are deposited on the bottom surface of the PET film 260 and function as top electrodes of the built-in toucha panel. A silver bar 240 also forms (e.g. through either sputtering or coating) at one end of each parallel stripes 210 of ITO on the PET film 260 for providing electrical conductance. The silver bar 240 is arranged to intersect each stripe 210 of ITO perpendicularly as it forms. As the top polarizer 220 and the PET film 260 is laid to combine with the top substrate 110 of the display panel, the PET film 260 is placed to make the ITO (indium tin oxide) electrodes beneath the PET film 260 perpendicular to the ITO (indium tin oxide) electrodes on the top substrate 110. Either the silver bar 240 on the top substrate 110 or the silver bar 240 on the PET film 260 can be an appropriate site for connecting cables between the liquid crystal display panel and foreign microprocessors or corresponding peripheral apparatus.

The liquid crystal display illustrated above is manufactured by forming a plurality of parallel stripes 210 of ITO (indium tin oxide) on the PET film 260 through vapor deposition or sputtering. Then the PET film 260 with the parallel ITO stripes 210 is combined with a top polarizer 220 by assistance of adherents. On the other hand, the top substrate 110 of a liquid crystal panel is deposited with parallel stripes 210 of ITO (indium tin oxide). On the surface of the top substrate 110 of the liquid crystal display, a plurality of spacers is sprayed homogeneously to form a layer of spacers 250. Then a silver bar 240 forms on the top substrate 110 of the liquid crystal display through printing or coating. The silver bar 240 is arranged to intersect one end of each ITO stripes 210. Then the PET film 260 is placed on the layer of spacers 250 and the top substrate 110 of the liquid crystal display. The bottom polarizer 230 is then adhered to the bottom substrate 120 of the liquid crystal display to form the liquid crystal display panel of the present invention.

In conventional liquid crystal display panel, the touch panel with protection film on the surface of the touch panel is stacked on the top surface of the liquid crystal display panels. There is also an air gap locating between the protection film (or the parallel stripes of ITO electrodes) of the touch panel and the surface of the liquid crystal display panel. Hence, there are many layers between the touch panel and the conventional liquid crystal display. However, compared with conventional liquid crystal display, the liquid crystal display of the present invention is thinner since no separation film or protection film between top substrate of the liquid crystal display is placed. The thickness of the liquid crystal display panel of the present invention is less than the combined assembly of the conventional liquid crystal display and the touch panel, In addition, since no separation film or protection film and no air gap is required to set between the touch panel and the liquid crystal display panel, the absorption or the loss of the intensity of the incident light can be effectively reduced. Therefore, the low brightness of the conventional combined assembly of touch panels and liquid crystal display panels display panel of the present invention can be well improved.

Figure 2:
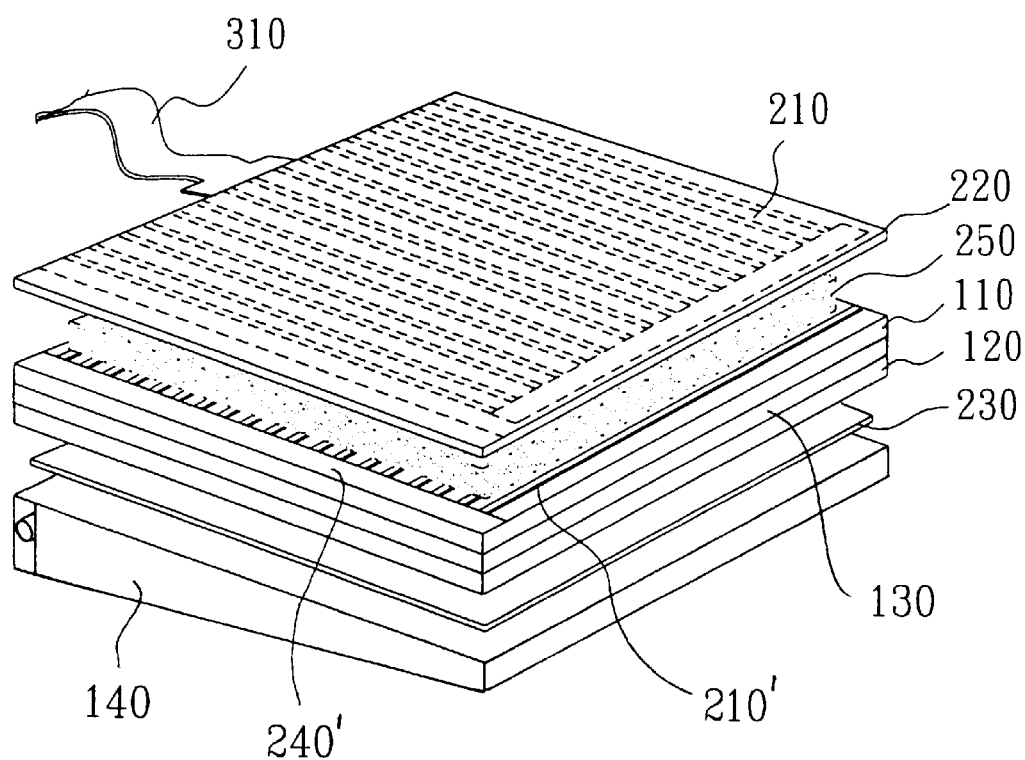
FIG. 2 is a perspective view of another of the embodiment of the liquid crystal display panel of the present invention.

With reference to FIG. 2, there is shown another embodiment of the liquid crystal display panel of the present invention. The TFT LCD (thin film transistor liquid crystal display) basically comprises a top substrate 110, a bottom substrate 120 and a layer of liquid crystal sealed between said top substrate and said bottom substrate (as shown in FIG. 2). For providing colors of the liquid crystal display panel, a layer of color filter is selectively attached to the inner surface of the top substrate 110. Outside the liquid crystal layer, a bottom polarizer 230 is attached to the bottom surface of the bottom substrate 120.

On the other hand, a plurality of parallel ITO (indium tin oxide) stripes 210 are deposited on the top surface of the top substrate 110. The ITO (indium tin oxide) stripes 210 on the top surface of the top substrate 110 act as bottom electrodes of a built-in touch-panel on the surface of the liquid crystal panel. On the top substrate 110 and the parallel ITO stripes 210, lots of dot spacers are sprayed to form a layer of spacers 250 to keep homogeneous thickness of the built-in touch panel on the top substrate 110. At one end of the each parallel stripe of the ITO electrodes 210, a silver bar 240 is deposited. The silver bar 240 are placed in a position close to one end of each ITO electrodes 210 on the first substrate 110 and is arranged to crossover each parallel stripe of ITO electrode 210 perpendicularly. The silver bar 240 on the substrate functions as a resistance pressure-sensing mechanism for sensing the resistance of the position of pressure on the built-in touch panel.

Over the spacer layer 250, a top polarizer 220 having multiple parallel ITO (indium tin oxide) stripes on the bottom surface of the top polarizer 220 is placed. The multiple parallel ITO (indium tin oxide) stripes 210 are deposited on the bottom surface of the top polarizer 220 and function as top electrodes of the built-in touch panel. A silver bar 240 forms (e.g. through either sputtering or coating) at one end of each parallel ITO stripe 210 on the top polarizer 220 for providing electrical conductance in future. The silver bar 240 on the top polarizer 220 is arranged to intersect each ITO stripe 210 perpendicularly as it forms. As the top polarizer 220 is laid to combine with the top substrate 110 of the liquid crystal display panel, the top polarizer 220 is placed to make sure that the ITO (indium tin oxide) electrodes 210 beneath the top polarizer 220 are perpendicular to the ITO (indium tin oxide) electrodes 210 on the top substrate 110. Either the silver bar on the top substrate or the silver bar on the top polarizer 220 can be an appropriate site for connecting cables between the liquid crystal display panel and foreign microprocessors or corresponding peripheral apparatus.

The liquid crystal display illustrated above is manufactured by forming a plurality of parallel stripes 210 of ITO (indium tin oxide) on the surface of the top polarizer 220 through any conventional process (e.g. vapor deposition or sputtering). The top substrate 110 of a liquid crystal panel is also deposited with parallel stripes 210 of ITO (indium tin oxide) by any conventional methods. On the surface of the top substrate 110 of the liquid crystal display, a plurality of spacers is sprayed homogeneously to form a layer of spacers 250. Then a silver bar 240 forms on the top substrate 110 of the liquid crystal display through traditional process (e.g. printing, sputtering or coating). The silver bar 240 is arranged to intersect one end of each ITO stripes 210. Then the top polarizer 220 is placed over the layer of spacers 250 and the top substrate 110 of the liquid crystal display. The bottom polarizer 230 is then adhered to the bottom substrate 120 of the liquid crystal display to form another type of the liquid crystal display panel of the present invention.

Compared with the assembly of the conventional liquid crystal display panel combined with a touch panel, since neither air gap nor protection film exists between the bottom parallel ITO stripes of the touch panel and the top substrate of the liquid crystal display panel, the thickness of the liquid crystal display panel of the present invention is less than that of the whole set of conventional liquid crystal display panel and a touch panel. Besides, since there is no air gap, protection film and/or PET film in the built-in touch panel of the present invention, the loss of brightness that caused by absorption of these films or gap can be effectively reduced. Therefore, the brightness of the display panel of the present invention can be well improved.

Figure 3:
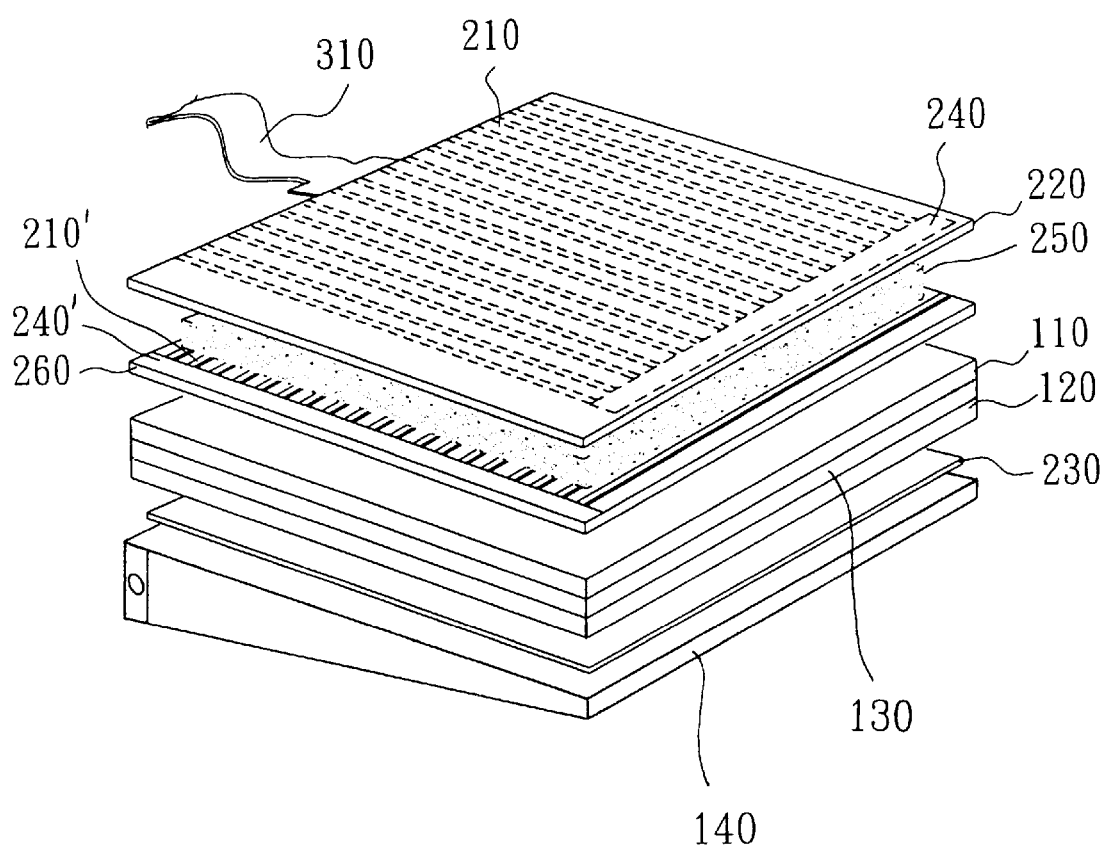
FIG. 3 is a perspective view of another of the embodiment of the liquid crystal display panel of the present invention.

With reference to FIG. 3, there is shown another embodiment of the liquid crystal display panel of the present invention. The TFT LCD (thin film transistor liquid crystal display) 100 basically comprises a top substrate 110, a bottom substrate 120 and a layer of liquid crystal sealed between said top substrate 110 and said bottom substrate 120 (as shown in FIG. 3). For providing colors of the liquid crystal display panel, a layer of color filter is selectively attached to the inside surface of the top substrate 110. Outside the liquid crystal layer, a bottom polarizer 230 is attached to the bottom surface of the bottom substrate 120. On the other hand, a plurality of parallel ITO (indium tin oxide) stripes 210 are deposited one surface of a PET film 260 through vapor deposition. Then the PET film 260 deposited by parallel ITO stripes 210 is attached to the top substrate 110 of the liquid crystal display panel by assistance of adherents. The ITO (indium tin oxide) stripes 210 on the PET film 260 of the top substrate 110 act as bottom electrodes of a built-in touch-panel on the surface of the liquid crystal panel. At one end of the each parallel stripe of the ITO electrodes 210, a silver bar 240 is deposited. The silver bar 240 are placed in a position close to the one end of each ITO electrodes 210 on the first substrate 110 and is arranged to crossover each parallel stripe 210 of the ITO electrode on the PET film 260 perpendicularly. The silver bar 240 on the PET film 260 functions as a pressure-sensing mechanism for sensing the resistance of the pushed position of pressure on the built-in touch panel. On the PET film 260 on the top substrate 110 and the parallel ITO stripes 210, lots of dot spacers are sprayed to form a layer of spacers 250 to maintain homogeneous thickness of the built-in touch panel on the top substrate 110.

Furthermore, a top polarizer 220 having multiple parallel ITO (indium tin oxide) stripes 210 on the bottom surface of the top polarizer 220 is placed over the layer of spacers. The multiple parallel ITO (indium tin oxide) stripes 210 are deposited on the bottom surface of the top polarizer 220 and function as top electrodes of the built-in touch panel. Another silver bar 240 forms (e.g. through either sputtering or coating) at one end of each parallel ITO stripe 210 on the top polarizer 220 for providing electrical conductance in future. The silver bar 240 on the top polarizer 220 is arranged to intersect each ITO stripe 210 perpendicularly as it forms. As the top polarizer 220 is laid to combine with the top substrate 110 of the display panel, the top polarizer 220 is placed to make sure that the ITO (indium tin oxide) electrodes 210 beneath the top polarizer 220 are perpendicular to the ITO (indium tin oxide) stripes 210 on the PET film 260 on the top substrate 110. Either the silver bar 240 on the top substrate 220 or the silver bar 240 on the top polarizer 220 can be an appropriate site for connecting cables between the liquid crystal display panel and foreign microprocessors or corresponding peripheral apparatus.

The liquid crystal display panel illustrated above is manufactured by forming a plurality of parallel stripes 210 of ITO (indium tin oxide) on the surface of the top polarizer 220 through any conventional process (e.g. vapor deposition or sputtering). The PET film 260 on top substrate 110 of a liquid crystal panel also can be deposited with parallel stripes 210 of ITO (indium tin oxide) by any conventional methods. The silver bar 240 forms on the PET film 260 on the top substrate 110 of the liquid crystal display through traditional process (e.g. printing, sputtering or coating). Either silver bar 240 is arranged to intersect one end of each ITO stripe 210. Then the top polarizer 220 is placed over the layer of spacers 250 and the top substrate 110 of the liquid crystal display. The bottom polarizer 230 is then adhered to the bottom substrate 120 of the liquid crystal display to form another type of the liquid crystal display panel of the present invention.

Compared with the conventional liquid crystal display panel combined with touch panel, since there is no air gap and protection film between the bottom parallel ITO stripes of the touch panel and the top substrate of the liquid crystal display panel, the thickness of the liquid crystal display panel of the present invention is less than that of the whole set of conventional liquid crystal display panel and a touch panel. Besides, since there is no air gap, and protection film in the touch panel, the loss of brightness that caused by absorption of these films or gap can be effectively reduced. Therefore, the brightness of the display panel of the present invention can be well improved.

Although the present invention has been explained in relation to its preferred embodiment, it is to be understood that many other possible modifications and variations can be made without departing from the spirit and scope of the invention as hereinafter claimed.

What is claimed is:

1. A liquid crystal display panel including a touch panel, comprising:

a display comprising one first substrate, one second substrate, a bottom polarizer and a liquid crystal layer, wherein said liquid crystal layer is located between said first substrate and said second substrate, said bottom polarizer being located on a first surface of said second substrate;

a top polarizer, said top polarizer being located above said first substrate; and a resistance pressure sensing mechanism for sensing a resistance of a position of pressure on the touch panel, said resistance pressure sensing mechanism including:

a plurality of parallel strips arranged to form first electrodes, said first electrodes being located on a second surface of said first substrate between said top polarizer and said first substrate;

a plurality of parallel strips arranged to form second electrodes, said second electrodes being located between said top polarizer and said first substrate; and a plurality of spacers, said spacers being located between said top polarizer and said first substrate or between said top polarizer and said first electrodes;

wherein a projection of said first electrodes on said first substrate intersects a projection of said second electrodes on said first electrodes.

2. The liquid crystal display panel as claimed in claim 1, wherein said film is a PET (polyethylene terephthalate) film, and wherein said PET (polyethylene terephthalate film is located between said top polarizer and said first electrodes, and said second electrodes are located on a surface of said PET (polyethylene terephthalate) film.

3. The liquid crystal display panel as claimed in claim 1, wherein said second electrodes are deposited on a surface of said top polarizer.

4. The liquid crystal display panel as claimed in claim 1, wherein said first electrodes are indium tin oxides.

5. The liquid crystal display panel as claimed in claim 1, wherein said second electrodes are indium tin oxides.

6. The liquid crystal panel as claimed in claim 1, wherein said projection of first electrodes on said first substrate intersects with said projection of second electrodes on said first substrate perpendicularly.

7. The liquid crystal panel as claimed in claim 1, further comprising a backlight unit module for providing light for said display.

8. A method for manufacturing a liquid crystal display and touch panel, comprising the steps of:

(A) providing a display comprising a first substrate, a second substrate, a bottom polarizer and a liquid crystal layer; wherein said liquid crystal layer is located between said first substrate and said second substrate, said bottom polarizer being located on a first surface of said second substrate;

(B) forming a plurality of first electrodes of a resistance pressure-sensing mechanism in parallel strips on said first substrate or on a bottom PET (polyethylene terephthalate) film;

(C) spraying spacers on the surface of said first substrate or the surface of said bottom PET (polyethylene terephthalate) film to form a layer of spacers;

(D) forming a plurality of second electrodes of said resistance pressure-sensing mechanism in parallel strips so as to be situated between the top polarizer and the first electrodes when the top polarizer or a top PET (polyethylene terephthalate) film is placed on said first substrate and said layer of spacers; and (E) placing said top polarizer or said top PET (polyethylene terephthalate) film on said first substrate and said layer of spacers;

wherein a projection of said first electrodes on said first substrate intersects a projection of said second electrodes on said first electrodes.

9. The method as claimed in claim 8, wherein in step (D), said parallel strips of said second electrodes are formed by laying a layer of PET (polyethylene terephthalate) film having a plurality of parallel of said second electrodes on a surface of said top polarizer.

10. The method as claimed in claim 8, further comprising the step (F) of laying a bottom polarizer on a surface of said top polarizer.

11. The method as claimed in claim 8, wherein the projection of said first electrodes on said first substrate is perpendicular to the projection of said second electrodes on said first substrate.

12. The method as claimed in claim 8, further comprising (G) combining a backlight assembly with said display unit to provide light source for said liquid crystal display panel.

* * * * *